(12) United States Patent
Petterson et al.

(10) Patent No.: US 7,650,854 B2
(45) Date of Patent: Jan. 26, 2010

(54) TEATCUP LINER AND A TEATCUP

(75) Inventors: Torbjorn Petterson, Gnesta (SE); Jan Kassibrahim, Norsborg (SE)

(73) Assignee: DeLaval Holding AB, Tumba (SE)

( * ) Notice: Subject to any disclaimer, the term of this patent is extended or adjusted under 35 U.S.C. 154(b) by 524 days.

(21) Appl. No.: 11/569,861

(22) PCT Filed: May 19, 2005

(86) PCT No.: PCT/SE2005/000747

§ 371 (c)(1),
(2), (4) Date: Nov. 30, 2006

(87) PCT Pub. No.: WO2005/120216

PCT Pub. Date: Dec. 22, 2005

(65) Prior Publication Data

US 2008/0035064 A1    Feb. 14, 2008

(30) Foreign Application Priority Data

Jun. 10, 2004    (SE) .................................... 0401484

(51) Int. Cl.
*A01J 5/06*    (2006.01)
(52) U.S. Cl. .................................. 119/14.49
(58) Field of Classification Search ............... 119/14.49
See application file for complete search history.

(56) References Cited

U.S. PATENT DOCUMENTS

| 1,916,839 A | 7/1933 | Hulbert |
| 1,982,452 A | 11/1934 | Persoons et al. |
| 3,096,740 A | 7/1963 | Noorlander |
| 3,308,788 A | 3/1967 | Noorlander |
| 4,280,446 A | 7/1981 | Noorlander |
| 4,459,939 A | 7/1984 | Noorlander |
| 4,530,307 A * | 7/1985 | Thompson ............... 119/14.49 |
| 5,572,947 A | 11/1996 | Larson et al. |
| 6,039,001 A * | 3/2000 | Sanford .................... 119/14.47 |

FOREIGN PATENT DOCUMENTS

| DE | 922 742 | 1/1955 |
| DE | 199 49 151 A1 | 4/2001 |
| EP | 0 717 927 A1 | 6/1996 |
| WO | WO 98/19519 | 5/1998 |
| WO | WO 01/45498 A1 | 6/2001 |

\* cited by examiner

*Primary Examiner*—Yvonne R. Abbott
(74) *Attorney, Agent, or Firm*—Hovey Williams LLP

(57) ABSTRACT

This invention refers to a teatcup liner and a teatcup. The liner (1) is mounted in a shell (2) of the teatcup and defines an inner space (3) for receiving a teat. The liner includes a primary component (12) forming a barrel. The primary component includes a peripheral portion (15), a primary connecting ring (16) and a lip (17) defining an opening (4). The secondary component includes a secondary peripheral portion (18) and a secondary connecting ring (20). The primary component is connectable to the secondary component for releasing the liner by a mutual engagement of the connecting rings. At least one of the connecting rings abuts the peripheral portion of the other component to form a sealing abutment between the two components.

29 Claims, 5 Drawing Sheets

Fig 1
Fig 2
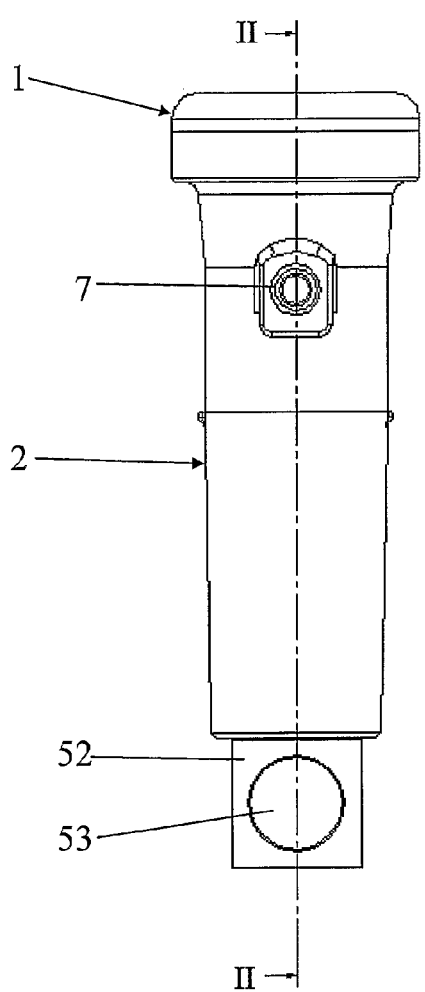
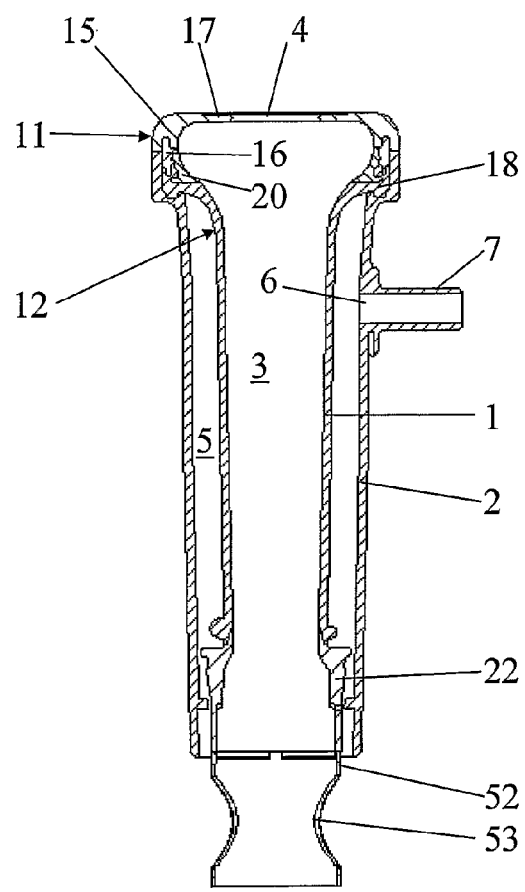

TEATCUP LINER AND A TEATCUP

Applicant hereby incorporates by reference International Application PCT/SE2005/000747, filed 19 May 2005, claiming priority from Swedish Application No. SE 0401484-1 filed 10 Jun. 2004 (also incorporated by reference herein).

BACKGROUND OF THE INVENTION AND PRIOR ART

The present invention refers to a teatcup liner adapted to be mounted in a shell to form a teatcup to be applied to a teat of an animal, the teatcup liner defining an inner space for receiving the teat and including a primary component forming an upper head of the teatcup liner and a secondary component forming a lower barrel of the teatcup liner, the primary component including a primary peripheral portion, a primary connecting ring extending downwardly from the primary peripheral portion, and a lip extending inwardly from the primary peripheral portion and defining an opening for the introduction of the teat, the secondary component including a secondary peripheral portion and a secondary connecting ring extending upwardly from the secondary peripheral portion, and the primary component being connectable to the secondary component for realising the teatcup liner by an engagement of the primary connecting ring to the secondary connecting ring.

Furthermore, the present invention refers to a teatcup liner as defined in the preamble of claim 19. The present invention also refers to a teatcup as defined in claim 29.

Teatcup liners are typically manufactured in a natural or synthetic rubber material. Rubber materials have many advantages connected to the elastic properties of rubber. These elastic properties are advantageous both during the manufacturing of the teatcup liner and during milking. The teatcup liner formed in a mould can easily be removed from the mould and the core shaping the inner space of the teatcup liner after the vulcanisation. However, the vulcanisation of the rubber requires a significant vulcanisation time before the rubber can be removed from the mould and the core. This is a limiting factor in the manufacturing of teatcup liners. It is desirable to be able to shorten the vulcanisation time.

In order to speed up the manufacturing process, it is proposed to manufacture teatcup liners in a plastic material, i.e. Thermo Plastic Elastomers, TPE. The solidification time needed after moulding of such a plastic material is significantly shorter than the vulcanisation time needed for a rubber material. Consequently, by using such a thermoplastic material in the teatcup liner it would be possible to speed up the manufacturing thereof. A further advantage of a thermoplastic material is that it may be re-used. However, the elasticity of thermoplastic materials is generally smaller than the elasticity of rubber, which means that a teatcup liner with a conventional design would be difficult to remove from the mould, and in particular the from core, after the solidification.

The inventors have realised that a higher flexibility regarding the selection of material or materials in the teatcup liner may be achieved if the teatcup liner is manufactured as a number of separate components, which are then connected to each other when the teatcup liner is mounted. However, such a teatcup liner would then include a joint between adjoining components. It is important that such a joint is designed in such a way that it is tight, preventing any leakage of air or milk, and preventing dirt and milk residuals from penetrating the joint, where they may promote bacterial growth.

DE-A-199 49 151 discloses a teatcup of the kind initially defined. The teatcup includes a teatcup liner and a shell. The teatcup liner includes a first component forming a head portion and a second component forming a barrel portion. The first and second components are joined to each other by means of a snap joint or a thread joint so that either one of them can be changed when so required. The teatcup liner of this prior art document is mounted in a shell, wherein the barrel portion is positioned in the shell. The barrel portion has lower end gripped by a lower end of the shell, and an upper end extending over the upper end of the shell. The head portion forms a separate part connectable to the assembly of the shell and the barrel portion. No particular measures have been taken to obtain a reliable and tight sealing between the head portion and the barrel portion.

SUMMARY OF THE INVENTION

The object of the present invention is to overcome the problems discussed above and to provide a new teatcup liner for a teatcup. A further object of the invention is to provide a new teatcup liner design, which permits manufacturing in a plastic material. A further object of the invention is to provide a teatcup including such a teatcup liner.

This object is achieved by the teacup liner initially defined, which is characterised in that the connecting ring of at least one of the components abuts the peripheral portion of the other component to form a sealing abutment between the primary component and the secondary component. Such a sealing abutment between one of the peripheral portions, which may be made in a relatively elastic and soft material, and one of the connecting rings, which may be made in a relatively rigid material, offers a tight and reliable joint between the two components. Advantageously, the primary connecting ring abuts the secondary peripheral portion to form a first sealing abutment, and the secondary connecting ring abuts the primary peripheral portion to form a second sealing abutment. In such a way two tight and reliable joints are provided between the two components.

According to an embodiment of the invention, the secondary peripheral portion has an outer peripheral surface adapted to abut an inner surface of the shell when the teatcup liner is mounted in the shell. The outer peripheral surface will then form a sealing abutment with the inner surface of the shell. An airtight enclosure of a pulsation chamber enclosed between the shell and the secondary component may thus be obtained. At least the secondary component may then also be substantially completely enclosed within the shell. Advantageously, the primary connecting ring is designed to be pressed into the secondary peripheral portion in such a way that the outer peripheral surface is forced outwardly against the inner surface of the shell.

According to a further embodiment of the invention, the primary connecting ring has an outer peripheral surface in alignment with the outer peripheral surface of the secondary peripheral portion.

According to a further embodiment of the invention, the primary connecting ring includes a primary engagement member and the secondary connecting ring includes a secondary engagement member, wherein the engagement members are in engagement with each other when the primary component is connected to the secondary component. Advantageously, the engagement members are adapted to engage each other by means of a snap action. In such a way a quick and reliable assembly of the teatcup liner is achieved.

According to a further embodiment of the invention, the primary peripheral portion has an inner peripheral surface adjoining the inner space. Furthermore, the secondary connecting ring may have an inner peripheral surface adjoining the inner space and being in alignment with the inner peripheral surface of the primary peripheral portion. With such a uniform inner transition between the primary and secondary components, dirt and milk residuals are efficiently prevented from penetrating the joint between the components from the inner space.

According to a further embodiment of the invention, the secondary peripheral portion has an annular projection extending downwardly and adapted to be positioned in an annular recess of the shell when the teatcup liner is mounted in the shell. In such a way a further sealing abutment is obtained between the shell and the secondary peripheral portion of the secondary component. The airtight enclosure of the pulsation chamber between the shell and the secondary component is therefore further improved. The annular projection may advantageously be provided beneath the outer peripheral surface of the secondary peripheral portion.

According to a further embodiment of the invention, the primary peripheral portion has a substantially radial surface adapted to abut a corresponding radial surface of the shell when the teatcup liner is mounted in the shell. In such a way a sealing abutment is obtained between the shell and the primary peripheral portion preventing dirt, milk residual or micro-organisms from penetrating the joint from outside. Advantageously, the substantially radial surface may be provided outside the outer peripheral surface of the primary connecting ring.

According to a further embodiment of the invention, the secondary component has a lower portion having a lower engagement member adapted to be in engagement with an engagement member of the shell. Advantageously, the secondary component also includes a grip member extending downwardly from the lower portion, and adapted to be gripped by an operator and, when the teatcup liner is to be mounted in the shell, to be maneuvered by a pulling and/or a rotating movement in relation to the shell in such a manner that the secondary component is stretched and the lower engagement portion is engaged by the engagement member of the shell. Such engagement members may be realised as a snap connection including a circumferential groove on one of the shell and the teatcup liner and a corresponding flange on the other of the shell and the teatcup liner. The engagement members may also be designed as a so-called bayonet connection. Advantageously, the grip member is disengageable from the lower portion of the secondary component when the teatcup liner has been mounted in the shell. The grip member may thus be thrown away after mounting of the teatcup.

According to a further embodiment of the invention, the primary peripheral portion and the secondary peripheral portion are manufactured in a relatively elastic material and that the primary connecting ring and the secondary connecting ring are manufactured in a relatively rigid material. By means of the rings in a relatively rigid or stiff material, a secure connection of the two components to each other is achieved. The more elastic or soft material, such as TPE, is advantageous for the parts being in contact with the teat of the animal, such as the lip and the middle part of the barrel. The invention enables the use of specific materials for the lip and the middle part of the barrel. For instance the lip may be made in a softer material than the remaining parts of the teatcup liner. Advantageously, the relatively rigid material of the connecting rings is substantially permanently joined to the relatively elastic material of the respective peripheral portion through a melting process.

The object is also achieved by the teatcup liner initially defined, which is characterised in that the teatcup liner includes a grip member extending downwardly from the lower portion and adapted to be gripped by an operator when the teatcup liner is to be mounted in the shell. By means of such a grip member the mounting and locking of the teatcup liner in the shell may be facilitated. Advantageous embodiments of the teatcup liner are defined in the dependent claims 20-28. Preferably, the grip member is adapted to be maneuvered by a pulling and/or a rotating movement in relation to the shell in such a manner that the barrel portion is stretched and the lower engagement member is engaged by the engagement member of the shell. The teatcup liner may thus be firmly secured in the shell in an easy manner. Moreover, the barrel portion may be manufactured in a relatively elastic material, such as TPE, and the lower portion and grip member may be manufactured in a relatively rigid material. The relatively rigid material of the lower portion may then be substantially permanently joined to the relatively elastic material of the barrel portion through a melting process.

The object is also achieved by the teacup initially defined, which includes a teatcup liner as specified above.

BRIEF DESCRIPTION OF THE DRAWINGS

The present invention is now to be explained more closely by the description of various embodiments and with reference to the drawings attached hereto.

FIG. 1 discloses a teatcup with a shell and a teatcup liner during mounting of the teatcup liner in the shell.

FIG. 2 discloses a sectional view along the line II-II in FIG. 1.

DETAILED DESCRIPTION OF VARIOUS EMBODIMENTS OF THE INVENTION

Figure 3:
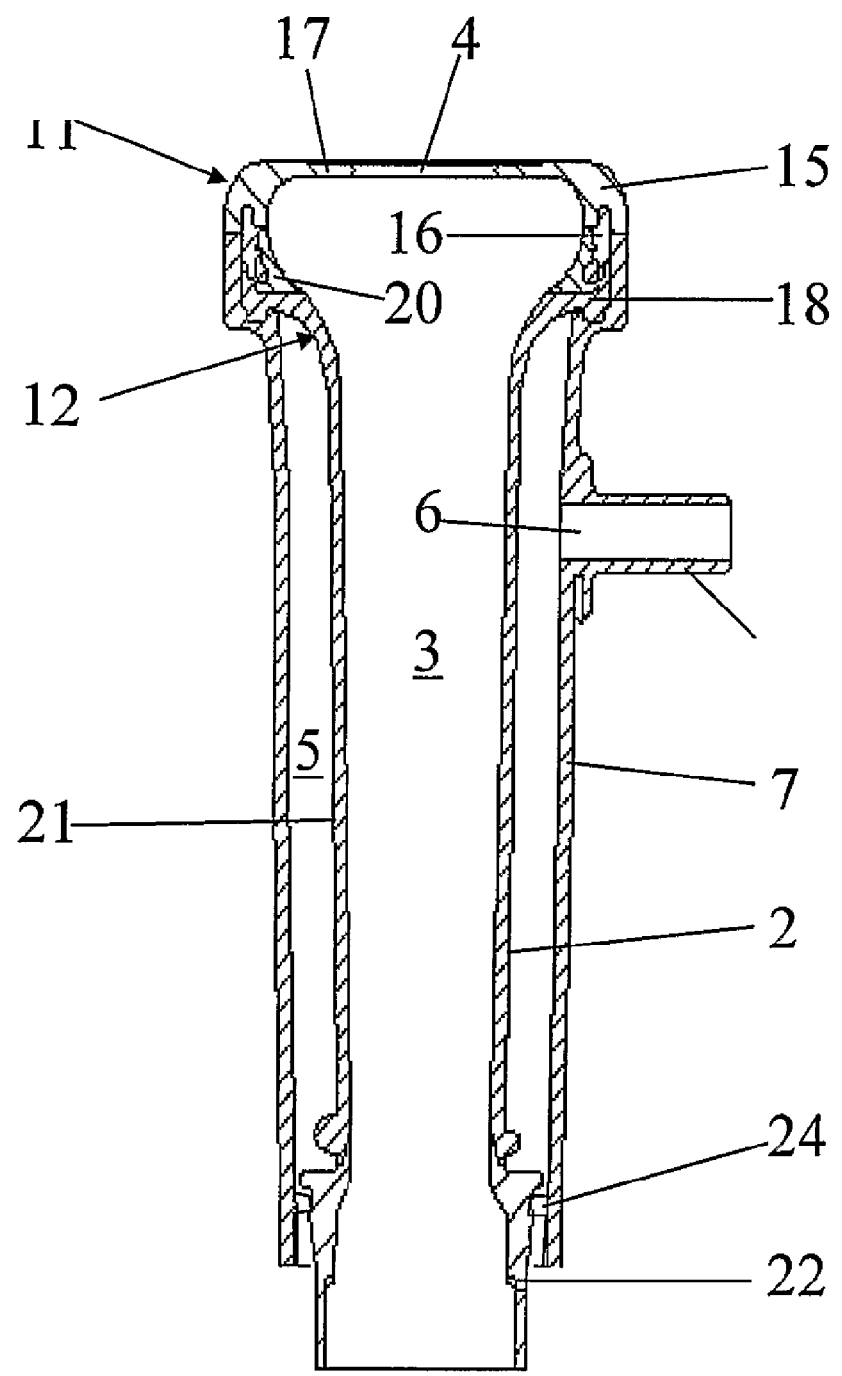
FIG. 3 discloses a sectional view similar to the one in FIG. 2, wherein the teatcup liner is mounted in the shell.

FIGS. 1 and 2 disclose a teatcup during mounting thereof. The teatcup includes a teatcup liner 1 and a shell 2. In FIG. 3, the teatcup liner 1 is completely mounted in the shell 2. The teatcup includes an inner space 3 defined by the teatcup liner 1 and adapted to receive a teat of an animal to be milked. The teat is introduced into the inner space 3 via an opening 4. A pulsation chamber 5 is formed between the shell 2 and the teatcup liner 1, as appears from FIG. 3. The pulsation chamber 5 is accessible via an aperture 6, which in the embodiment disclosed is formed by a pulsation nipple 7. In use, the teatcup is, as disclosed in FIG. 3, intended to be mounted in a holding device (not disclosed), which connects the inner space 3 of the teatcup to a milk conduit (not disclosed) for the application of a low pressure or vacuum and for the transport of milk from the teat present in the inner space 3. The pulsation nipple 7 may be directly connected to a pulsation conduit (not disclosed) or indirectly via a pulsation connector provided on the holding device.

Figure 4:
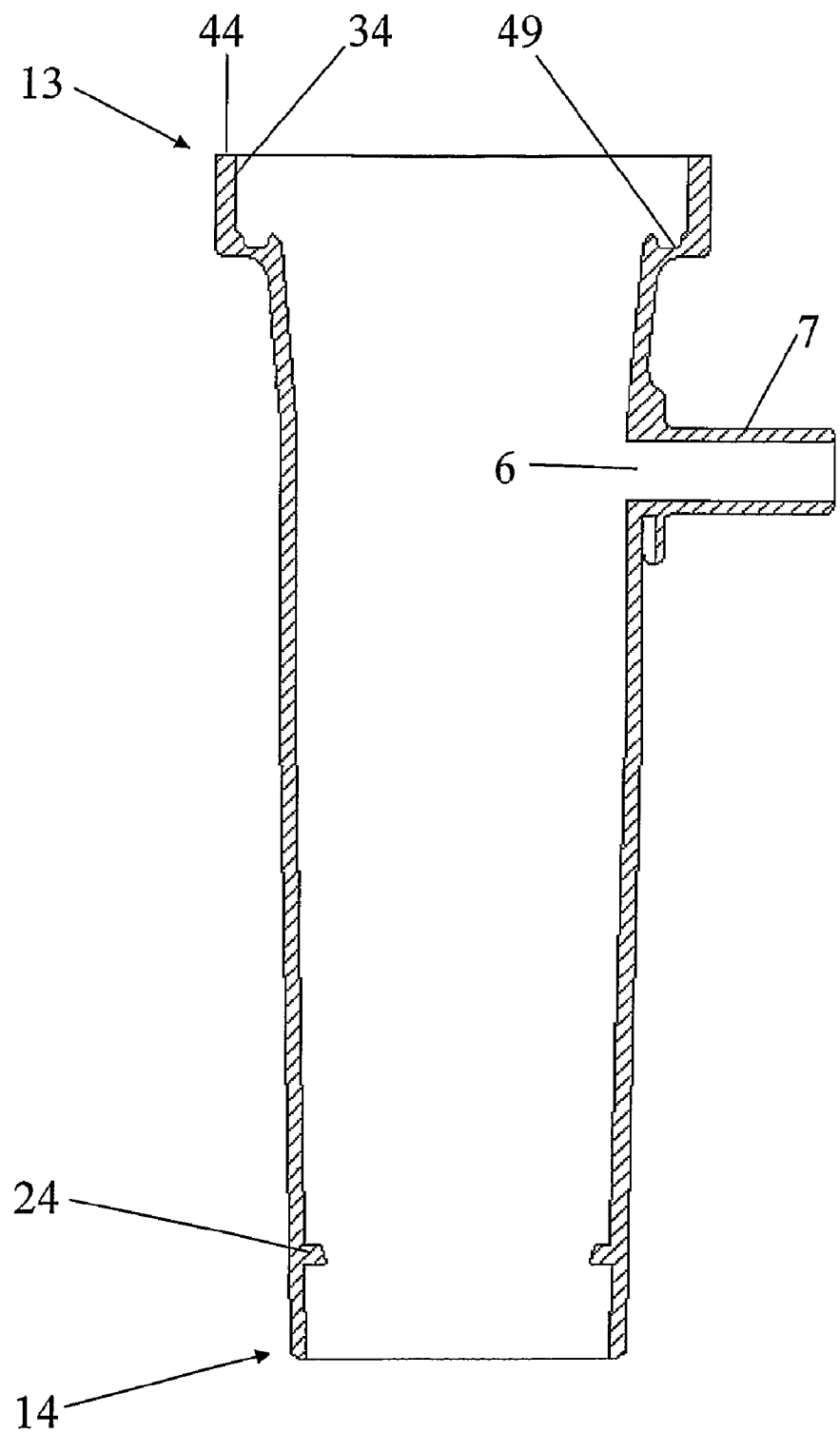
FIG. 4 discloses a sectional view of the shell.

The teatcup liner 1 includes a primary component 11 and a secondary component 12. The primary component 11 forms an upper head of the teatcup liner 1 and the second component 12 forms a lower barrel of the teatcup liner 1. The shell 2, which is disclosed more closely in FIG. 4, has an upper end 13 and a lower end 14.

Figure 5:
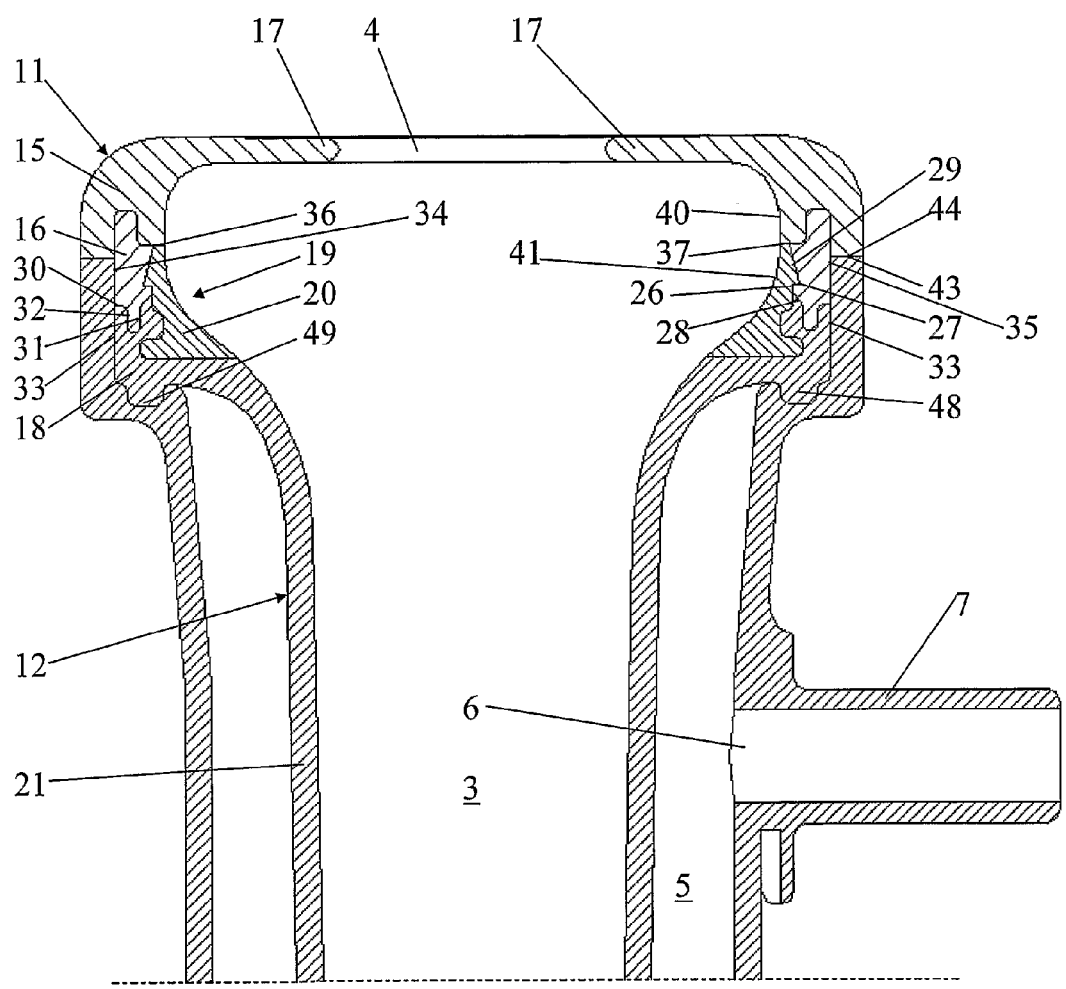
FIG. 5 discloses a sectional view of an upper part of the teatcup.

The primary component 11 is disclosed more closely in FIG. 5. The primary component 11 includes a primary peripheral portion 15 and a primary connecting ring 16 extending downwardly from the primary peripheral portion 15. The primary component 11 also includes a lip 17 extending inwardly from the primary peripheral portion 15 and defining the opening 4 for the introduction of the teat. The primary peripheral portion 15 and the lip 17 are manufactured in the same material. Preferably, the primary peripheral portion 15 and the lip 17 are manufactured in a first, relatively elastic and soft material, such as Thermo Plastic Elastomers, TPE. The primary connecting ring 16 is manufactured in a second, relatively rigid and stiff material, i.e. the second material is more rigid and less elastic than the first material. The second material may be a thermoplastic material, selected from the group of polyolefins.

The secondary component 12 includes a secondary peripheral portion 18 provided at an upper end 19 of the secondary component 12, see FIG. 5. The secondary component 12 also includes a secondary connecting ring 20 extending upwardly from the secondary peripheral portion 18. Furthermore, the secondary component 12 includes the mentioned barrel 21 extending downwardly from the secondary peripheral portion 18 and adapted to abut the teat introduced into the inner space 3 of the teatcup. The secondary component 12 also has a lower portion 22, which includes a lower engagement member 23 adapted to be in engagement with an engagement member 24 of the shell 3, see FIGS. 3 and 6. Also the secondary peripheral portion 18 and the barrel 21 are manufactured in a first, relatively elastic and soft material, such as a thermoplastic elastomer, TPE. The secondary connecting ring 16 and the lower portion 22 are manufactured in a second, relatively rigid plastic material, i.e. the second material is more rigid and less elastic than the first material. The first material of the primary component 11 must not be the same as the first material of the secondary component 12. Likewise, the second material of the primary connecting ring 16 must not be the same as the second material of the secondary connecting ring 20. It is also possible to make any part of the components 11, 12 in a different material, for instance the lip may be made in a softer material than the primary peripheral portion 15, the secondary peripheral portion 18 and the barrel 21.

The teatcup liner 1 is thus mounted by connecting the primary component 11 to the secondary component 12. In order to enable this connection, the primary connecting ring 16 has a primary engagement member 26, and the secondary connecting ring 20 has a secondary engagement member 27, see FIG. 5. The primary engagement member 26 is formed by a hook-like shoulder extending around the primary connecting ring 16 on an inner side surface thereof. The secondary engagement member 27 includes a corresponding hook-like shoulder extending around the secondary connecting ring 20 on an outer side surface thereof. The two engagement members 26, 27 form a snap connection. Consequently, when the primary connecting ring 16 is pressed downwardly over the secondary connecting ring 20, the primary engagement member 26 will slide over the secondary engagement member 27 and be firmly engaged when the shoulder of the primary engagement member 26 passes the shoulder of the secondary engagement member 27.

The shoulder of the primary connecting ring 16 is delimited by a surrounding surface 28 which is inclined downwardly and outwardly from this shoulder. The shoulder of the secondary connecting ring 20 is delimited by a surrounding surface 29 which is inclined upwardly and inwardly from this shoulder. The surfaces 28, 29 are thus arranged in such a way that these two inclined surfaces 28, 29 slide on each other during the downward movement of the primary component 11 onto the secondary component 12. This movement is thus facilitated.

It should be noted that the engagement members 26, 27 may be designed in many different manners. It is essential that the two components 11, 12 are easily connectable to each other. However, when the two components 11 and 12 are connected the engagement of the two components 11, 12 should preferably be firm and rigid.

As shown in FIG. 5, the primary connecting ring 16 abuts the secondary peripheral portion 18 so that a first sealing abutment is achieved therebetween. The secondary peripheral portion 18 has an upper substantially radial surface 30. This surface 30 has an annular groove 31. The primary connecting ring 16 has an annular projection 32, which is pressed into the annular groove 31 when the engagement members 26, 27 engage each other. The projection 32 and the groove 31 are designed in such a manner that an outer peripheral surface 33 of the secondary peripheral portion 18 will be pressed slightly outwardly. When the teatcup liner 1 is mounted in the shell 2, the outer peripheral surface of the secondary peripheral portion 18 thus will abut an inner peripheral surface 34 of the shell 2. As shown in FIG. 5, the primary connecting ring 16 also has an outer peripheral surface 35, which is aligned with the outer peripheral surface 33 of the secondary peripheral portion 18.

The second connecting ring 20 abuts the primary peripheral portion 15 to form a second sealing abutment between the primary component 11 and the secondary component 12 when the engagement members 26, 27 engage each other. The secondary connecting ring 20 has an upper substantially radial surface 36. The primary peripheral portion 15 has a lower substantially radial surface 37 extending inwardly from the primary peripheral ring 16. These two radial surfaces 36, 37 are adapted to abut tightly each other when the engagement members 26, 27 engage each other. Furthermore, the primary peripheral portion 15 has an inner peripheral surface 40 adjoining the inner space 3. The secondary connecting ring 20 also has an inner peripheral surface 41 adjoining the inner space 3. These two inner surfaces 40, 41 are in alignment with each other when the engagement members 26, 27 engage each other. The two inner surfaces 40, 41 and the two radial surfaces 36, 37 together form a smooth and uniform inner transition between the primary component 11 and the second component 12 facing the inner space 3 of the teatcup liner 1. Such a transition prevents dirt and milk residuals from penetrating the joint between the components 11 and 12 from the inner space 3.

The primary peripheral portion 15 also has a substantially radial lower surface 43 extending outwardly from the primary connecting ring 16. The shell 2 has a corresponding substantially radial upper surface 44 at the upper end 13. The radial surface 43 is adapted to abut tightly the corresponding radial surface 44 when the teatcup liner 1 is mounted in the shell 2 in such a way that a sealing abutment, and thus a tight joint, is formed therebetween. At least at this joint, the outer surface of the shell 2 is aligned with the outer surface of the primary peripheral portion 15 so that a smooth and uniform transition is formed also at the outside of the teatcup when the teatcup liner 1 is mounted in the shell 2.

Furthermore, the secondary peripheral portion 18 has an annular projection 48 extending downwardly and adapted to be positioned in an annular recess 49 provided in the proximity of the upper end 13 of the shell 2 when the teatcup liner 1 is mounted in the shell 2. The annular projection 48 is provided beneath the outer peripheral surface 33 of the secondary peripheral portion 18. The recess 49 is provided inside and beneath the inner peripheral surface 34 of the shell 2.

Figure 6:
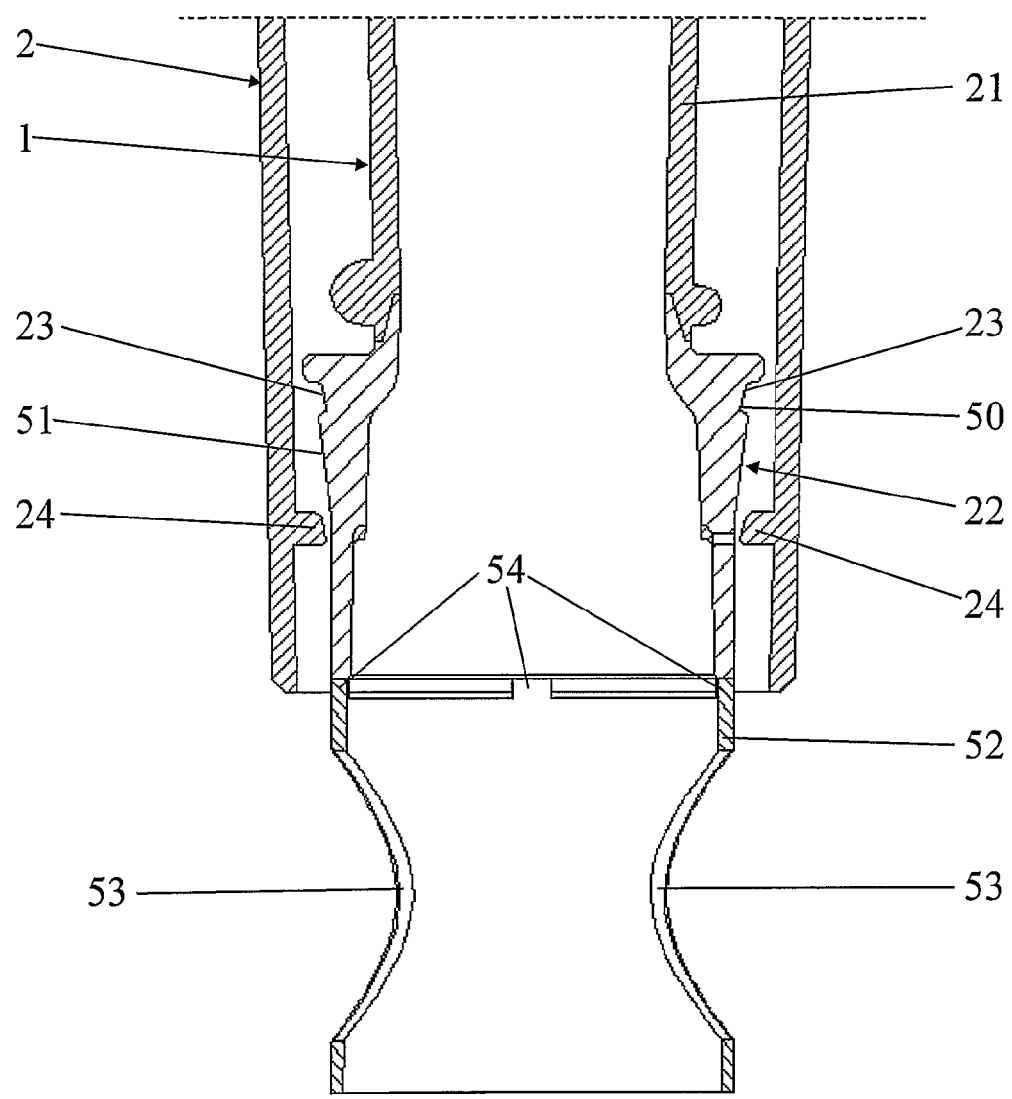
FIG. 6 discloses a sectional view of a lower part of the teatcup.

In the embodiment disclosed in FIG. 6, the lower engagement member 23 is formed by a peripheral groove 50 extending in the outer surface of the lower portion 22 and an inclined peripheral surface 51 sloping upwardly and outwardly to the groove 50. The engagement member 24 of the shell 2 is formed by an annular flange extending inwardly from the inner surface of the shell 2 and designed to fit in the groove 50. The secondary component 12 also includes a grip member 52 extending downwardly from the lower portion 22. The grip member 52 is adapted to be gripped by an operator. In the embodiment disclosed in FIG. 6, the grip member 52 is formed by a tubular portion extending downwardly from the tubular lower portion 22 and having a grip in the form of two opposite apertures 53 extending through the wall of the tubular grip member 52. The grip member 52 connected to the lower portion 22 at a limited number of weak portions 54 providing a limited strength so that the grip member 52 is disengageable from the lower portion 22 by means of the application of a certain force. The grip member 52 and the lower portion 22 form a common piece manufactured in the above-mentioned relatively rigid, plastic material.

The teatcup liner 1 and the teatcup can be mounted in the following manner. In a first step, the first component 11 is pressed onto the second component 12, wherein the primary engagement member 26 slides over the surrounding surface 29 and the secondary engagement member 27 slides over the surrounding surface 28. The primary engagement member 26 is firmly engaged when the shoulder of the primary engagement member 26 snaps over the shoulder of the secondary engagement member 27. At the same time, the annular projection 32 is pressed down into the annular recess 31, and the lower radial surface 37 will abut tightly the upper radial surface 36. When this snap engagement is completed, the teatcup liner 1 is ready for being mounted in the shell 2. The teatcup liner is then introduced into the shell 2, wherein the grip member 52 and the lower portion 22 is introduced from above, i.e. into the shell 2 via the upper end 13. The teatcup liner 1 is easily pushed down so that the grip member 52 protrudes from the lower end 14. The grip member 52 is then gripped and the teatcup liner 1 is pulled downwardly in relation to the shell 2, wherein the annular projection 48 is pressed into the annular recess 49, and the radial lower surface 43 will abut tightly the radial upper surface 44. By the application of an additional pulling force the flange of the engagement member 24 will slide upwardly on the inclined surface 51 until the flange snaps into the groove 50. The teatcup liner 1 is now stretched appropriately and fixedly attached in the shell 2. Thereafter, a further pulling or bending force is applied to the grip member 52 in order to disengage the grip member 52 from the lower portion 22 before the teatcup is ready for use.

It is to be noted here that the engagement members 23, 24 may be designed in various ways. For instance, instead of relaying on merely a pulling movement for completing the engagement, the engagement may be obtained by a rotating movement or by means of a combination of a rotating movement and a pulling movement. Such an alternative engagement may be realised by means of a so called bayonet connection, wherein the grip member 52 is rotated until the engagement members 23, 24 engage each other. Thereafter, the grip member 52 may be rotated in an opposite direction in order to ensure that the barrel 21 is not mounted in a twisted state in the shell 2.

The primary component 11 and the secondary component 12 may be manufactured through a respective moulding process. More specifically, the primary component 11 may be manufactured by providing the primary connecting ring 16 of a relatively rigid plastic material and a primary core in a primary mould cavity (not disclosed). A relatively elastic material, in the form of a thermoplastic elastomer, is then injected into the primary mould cavity, in which the thermoplastic material will contact the plastic material of the primary connecting ring 16 and form a substantially permanent joint therebetween through a melting process. After solidification, the primary connecting ring 16 is thus integrally connected to the primary peripheral portion 15, and the primary component 11 is removed from the primary mould cavity and from the primary core.

The secondary component 12 may be manufactured in a similar manner by providing the secondary connecting ring 20 of a relatively rigid plastic material, the lower portion 22 with the grip member 52 of a relatively rigid plastic material, and a secondary core in a secondary mould cavity (not disclosed). A thermoplastic elastomer is then injected into the secondary mould cavity, in which the thermoplastic material will contact the plastic material of the secondary connecting ring 20 and the lower portion 22, and form a respective substantially permanent joint therebetween through a melting process. After solidification, the secondary connecting ring 20 is thus integrally connected to the secondary peripheral portion, and the lower portion 22 is integrally connected to the barrel 21, wherein the secondary component 12 is removed from the secondary mould cavity and from the secondary core. The primary component 11 and the secondary component 12 are the connected to each other as described above.

The connecting rings 16, 20 and the lower portion 22 with the grip member 52 may be pre-manufactured in a respective separate moulding process by injection of a plastic material in a respective mould cavity. However, the connecting rings 16, 20 and the lower portion 22 with the grip member 52 may also be manufactured in the above-mentioned primary mould cavity and the secondary mould cavity, respectively, as a pre-moulding step, wherein the mould cavities are adjustable to permit moulding of the respective connecting ring 16, 20 and the lower portion 22 with the grip member 52 in a first step and moulding of the remaining part of the respective component 11, 12 in a second step.

The present invention is not limited to the embodiments disclosed but may be varied and modified within the scope of the following claims.

The invention claimed is:

1. A teatcup liner adapted to be mounted in a shell to form a teatcup to be applied to a teat of an animal, said teatcup liner comprising:
    an inner space for receiving the teat and including a primary component forming an upper head of the teatcup liner and a secondary component forming a lower barrel of the teatcup liner,
    wherein the primary component includes a primary peripheral portion, a primary connecting ring extending downwardly from the primary peripheral portion, and a lip extending inwardly from the primary peripheral portion and defining an opening for the introduction of the teat,
    wherein the secondary component includes a secondary peripheral portion and a secondary connecting ring extending upwardly from the secondary peripheral portion, and
    wherein the primary component is connectable to the secondary component for realising the teatcup liner by an engagement of the primary connecting ring to the secondary connecting ring, wherein the connecting ring of at least one of the primary and secondary components abuts the peripheral portion of the other component to form a sealing abutment between the primary component and the secondary component.

2. A teatcup liner according to claim 1, wherein the primary connecting ring abuts the secondary peripheral portion to form a first sealing abutment and that the secondary connecting ring abuts the primary peripheral portion to form a second sealing abutment.

3. A teatcup liner according to claim 1, wherein the secondary peripheral portion has an outer peripheral surface adapted to abut an inner surface of the shell when the teatcup liner is mounted in the shell.

4. A teatcup liner according to claim 3, wherein the primary connecting ring is designed to be pressed into the secondary peripheral portion in such a way that the outer peripheral surface is forced outwardly against the inner surface of the shell.

5. A teatcup liner according to claim 3, wherein the primary connecting ring has an outer peripheral surface in alignment with the outer peripheral surface of the secondary peripheral portion.

6. A teatcup liner according to claim 5, wherein the primary peripheral portion has a substantially radial surface adapted to abut a corresponding substantially radial surface of the shell when the teatcup liner is mounted in the shell, and wherein the substantially radial surface of the primary peripheral portion is provided outside the outer peripheral surface of the primary connecting ring.

7. A teatcup liner according to claim 3, wherein the secondary peripheral portion has an annular projection extending downwardly and adapted to be positioned in an annular recess of the shell when the teatcup liner is mounted in the shell, and wherein the annular projection is provided beneath the outer peripheral surface of the secondary peripheral portion.

8. A teatcup liner according to claim 1, wherein the primary connecting ring includes a primary engagement member and the secondary connecting ring includes a secondary engagement member, wherein the primary and secondary engagement members are in engagement with each other when the primary component is connected to the secondary component.

9. A teatcup liner according to claim 8, wherein the engagement members are adapted to engage each other by means of a snap action.

10. A teatcup liner according to claim 1, wherein the primary peripheral portion has an inner peripheral surface adjoining the inner space.

11. A teatcup liner according to claim 10, wherein the secondary connecting ring has an inner peripheral surface adjoining the inner space and being in alignment with the inner peripheral surface of the primary peripheral portion.

12. A teatcup liner according to claim 1, wherein the secondary peripheral portion has an annular projection extending downwardly and adapted to be positioned in an annular recess of the shell when the teatcup liner is mounted in the shell.

13. A teatcup liner according to claim 1, wherein the primary peripheral portion has a substantially radial surface adapted to abut a corresponding substantially radial surface of the shell when the teatcup liner is mounted in the shell.

14. A teatcup liner according to claim 1, wherein the secondary component has a lower portion having a lower engagement member adapted to be in engagement with an engagement member of the shell.

15. A teatcup liner according to claim 14, wherein the secondary component includes a grip member extending downwardly from the lower portion and adapted to be gripped by an operator and, when the teatcup liner is to be mounted in the shell, to be maneuvered by a pulling and/or a rotating movement in relation to the shell in such a manner that the secondary component is stretched and the lower engagement member is engaged by the engagement member of the shell.

16. A teatcup liner according to claim 15, wherein the grip member is disengageable from the lower portion of the secondary component when the teatcup liner has been mounted in the shell.

17. A teatcup liner according to claim 1, wherein the primary peripheral portion and the secondary peripheral portion are manufactured in a relatively elastic material and that the primary connecting ring and the secondary connecting ring are manufactured in a relatively rigid material.

18. A teatcup liner according to claim 17, wherein the relatively rigid material of the connecting rings is substantially permanently joined to the relatively elastic material of the respective peripheral portion through a melting process.

19. In combination, a teatcup to be applied to a teat of an animal, said teatcup comprising a shell and a teatcup liner according to claim 1.

20. A teatcup liner adapted to be mounted in a shell to form a teatcup to be applied to a teat of an animal, said teatcup liner comprising:
   an inner space for receiving the teat, an upper head with a lip and a lower barrel; wherein the lower barrel includes a lower portion having a lower engagement member adapted to be in engagement with an engagement member of the shell, and
   wherein the teatcup liner includes a grip member extending downwardly from the lower portion and adapted to be gripped by an operator when the teatcup liner is to be mounted in the shell, and
   wherein the lower barrel is manufactured of a relatively elastic material and the lower portion and grip member are manufactured of a relatively rigid material, wherein the relatively rigid material of the lower portion is substantially permanently joined to the relatively elastic material of the lower barrel through a melting process.

21. A teatcup liner according to claim 20, wherein the grip member, when the teatcup liner is to be mounted in the shell, is adapted to be maneuvered by a pulling and/or a rotating movement in relation to the shell in such a manner that the lower barrel is stretched and the lower engagement member is engaged by an engagement member of the shell.

22. A teatcup liner according to claim 21, wherein the grip member is disengageable from the lower portion when the teatcup liner has been mounted in the shell.

23. A teatcup liner according to claim 20, wherein the grip member is formed by a tubular portion extending downwardly from the lower portion.

24. A teatcup liner according to claim 23, wherein the grip member includes a grip in the form of two opposite apertures extending through a wall of the tubular grip member.

25. A teatcup liner according to claim 20, wherein the grip member is connected to the lower portion at a limited number of weak portions providing a limited strength so that the grip member is disengageable from the lower portion by means of the application of a certain force.

26. In combination, a teatcup to be applied to a teat of an animal, said teatcup comprising a shell and a teatcup liner according to claim 20.

27. A teatcup liner adapted to be mounted in a shell to form a teatcup to be applied to a teat of an animal, said teatcup liner comprising:

an inner space for receiving the teat, an upper head with a lip and a lower barrel; wherein the lower barrel includes a lower portion having a lower engagement member adapted to be in engagement with an engagement member of the shell, and wherein the teatcup liner includes a grip member extending downwardly from the lower portion and adapted to be gripped by an operator when the teatcup liner is to be mounted in the shell, wherein the teatcup liner includes a primary component forming the upper head of the teatcup liner and a secondary component forming the lower barrel of the teatcup liner, the primary component including a primary peripheral portion, a primary connecting ring extending downwardly from the primary peripheral portion, and a lip extending inwardly from the primary peripheral portion and defining an opening for the introduction of the teat, the secondary component including a secondary peripheral portion and a secondary connecting ring extending upwardly from the secondary peripheral portion, and the primary component being connectable to the secondary component for realising the teatcup liner by an engagement of the primary connecting ring to the secondary connecting ring.

28. A teatcup liner according to claim 27, wherein the connecting ring of at least one of the components abuts the peripheral portion of the other component to form a sealing abutment between the primary component and the secondary component.

29. A teatcup liner adapted to be mounted in a shell to form a teatcup to be applied to a teat of an animal, said teatcup liner comprising:

an inner space for receiving the teat, an upper head with a lip and a lower barrel; wherein the lower barrel includes a lower portion having a lower engagement member adapted to be in engagement with an engagement member of the shell, and wherein the teatcup liner includes a grip member extending downwardly from the lower portion and adapted to be gripped by an operator when the teatcup liner is to be mounted in the shell, wherein the grip member includes a grip in the form of at least one aperture.

* * * * *